July 12, 1932.  L. D. WOODRUFF  1,867,296
AIR LINE COUPLING
Filed Nov. 14, 1929
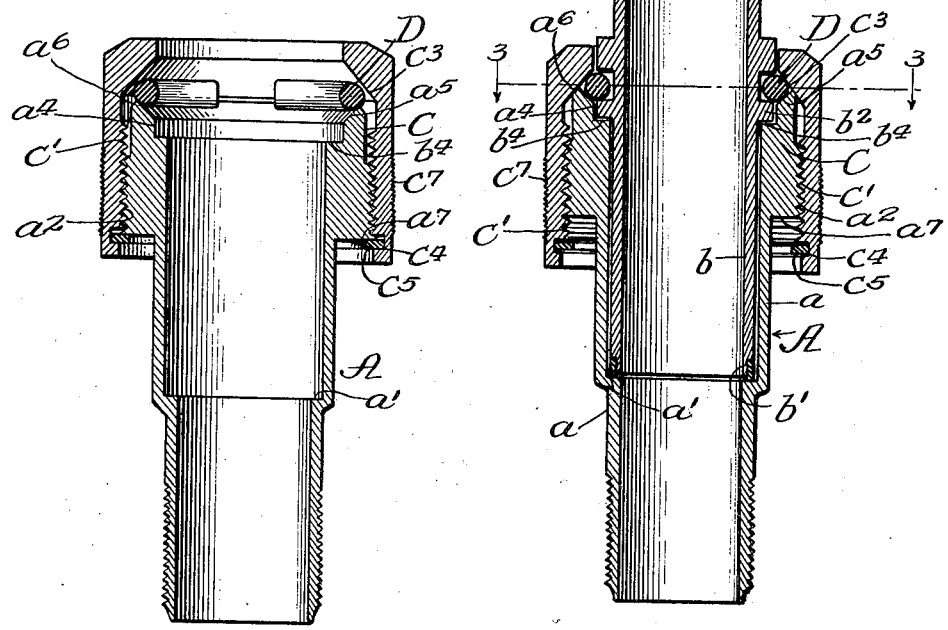
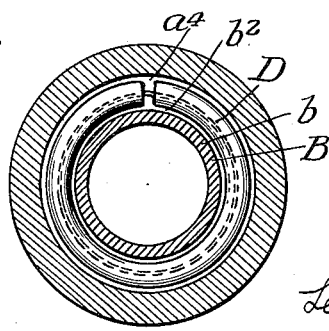
Inventor
Leonidas D. Woodruff
By Fred Gerlach
Atty.

Patented July 12, 1932

1,867,296

UNITED STATES PATENT OFFICE

LEONIDAS D. WOODRUFF, OF CHICAGO, ILLINOIS

AIR LINE COUPLING

Application filed November 14, 1929. Serial No. 407,064.

The invention relates to couplings for compressed air lines.

One object of the invention is to provide an improved coupling which may be quickly connected and disconnected and in which the members are free for relative rotation.

In couplings of this type heretofore employed, in which cams or fingers were used to lock the members together, the cams or fingers were pivotally or loosely held. In practice it has been found that these devices frequently become broken or worn and drop out or become lost so that the couplings become unfit for service. Another object of the invention is to provide an improved coupling by which these objections are overcome and in which a contractible ring is held between one coupling-member and the coupling-sleeve and is inwardly contractible to lock the members against longitudinal separation, so that pivotal or loose locking devices may be dispensed with.

The invention consists in the several novel features hereinafter set forth and more particularly defined by claims at the conclusion hereof.

In the drawing which accompanies and forms a part of this specification or disclosure and in which like numerals of reference denote corresponding parts throughout the several views: Fig. 1 is a longitudinal section of a coupling embodying the invention, the members being shown in operatively connected relation. Fig. 2 is a section of one of the coupling-members and the coupling-sleeve with the locking ring expanded to permit the insertion or removal of the other coupling-member. Fig. 3 is a section on line 3—3 of Fig. 1.

The invention is exemplified in a coupling comprising tubular coupling-members A and B and a coupling-sleeve C. These members serve as fittings adapted to be attached to hose-sections, pipes or other fittings of a compressed air line by clamps or any suitable means, as well understood in the art. Member B has a nipple $b$ which is adapted to extend into the portion $a'$ of member A so that the members can be telescoped together. An annular shoulder $a'$ in the member A forms a seat for the free end of the member B. If desired, a gasket $b'$ may be provided on the end of the member B to prevent leakage of air through the joint between the members. The coupling-sleeve C is provided with an internal screw thread $c'$ which engages a corresponding thread $a^2$ on the coupling-member A, and on its outer periphery with a knurled portion $c^7$ for gripping it for turning. An annular shoulder $b^2$ is formed on member B and fits in a counter-bore or annular recess $a^4$ in member A. A split resilient ring D, preferably formed of round spring wire, is held between member A and sleeve C, is normally expanded when the sleeve is screwed into releasing position, and is adapted to be contracted to overlap the outer side of shoulder $b^2$ and lock the members together against relative longitudinal movement while permitting relative rotation thereof. For the purpose of contracting the locking-ring D by the manipulation of the coupling-sleeve C, the end of member A has an outwardly flared conical face $a^5$, and sleeve C has an inwardly or reversely tapered conical end-face $c^3$, between which the locking ring D is confined at all times and by which it will be contracted as the coupling-sleeve is screwed onto the member A. These surfaces $c^3$ and $a^5$ act as wedge-cones to contract ring C and permit it to expand. When the sleeve is turned off member A the locking ring D will expand or spring outwardly by reason of its inherent resiliency, under control of the conical faces $a^5$ and $c^3$ on member A and coupling-sleeve C, respectively. The outer edge of the end of member A is inclined, as at $a^6$, so that it conforms to and engages the conical surface $c^3$ of the coupling-sleeve to form a positive stop for the sleeve and to limit the contraction of the ring D in order to prevent excessive contraction of the locking ring D so it will not be jammed against the member B and prevent relative rotation of the coupling-members.

The conoidal surfaces $c^3$ and $a^5$ are of sufficient length and angle to force the ring D over the shoulder $b^3$ and stop surface $a^6$ is positioned to prevent said conoidal surfaces from forcing said ring against the wall of the coupling member B so that the ring will hold the members against relative longitudinal movement but not against relative rotation. Ring D will be centralized or definitely positioned between the conoidal surfaces $b^2$ and $c^3$ so that the ring, when the sleeve C is rotated to release the member B, will expand sufficiently to permit the shoulder $b^3$ to clear it during the separation of the members. Said ring will be retained through its inherent resiliency in the sleeve, while the coupling-members are disconnected.

An annular shoulder $b^4$ is formed on the member A and is spaced from the shoulder $b^2$ so an annular groove for the locking ring D will be formed between said shoulders. The shoulder $b^4$ is preferably larger in diameter than the shoulder $b^2$ so that it will not pass through the locking ring D when it is expanded, to prevent the wrong end of the member B from being inserted into the member A.

An internal annular groove $c^4$ is formed adjacent one end of the coupling ring C and a split locking ring $c^5$ is held in the groove. This ring is adapted to abut against a shoulder $a^7$ on member A to prevent the sleeve from being turned completely off the member A so that it will not become lost or separated from said member.

In assembling the coupling, the sleeve C will be unscrewed from member A to the point where it is arrested by the locking ring $c^5$. When the sleeve is in this position the locking ring D will be expanded sufficiently to permit the shoulder $b^2$ to clear the inner periphery of the ring so that the nipple $b$ of member B can be inserted into the member A. When the member B has been inserted, the coupling-sleeve C will be turned to cause its screw-threaded connection with the member A to move the conoidal surface $c^3$ toward the conoidal surface $a^5$ which will force the ring D to contract around the member A and overlap the shoulder $b^2$. The collar C will be rotated until its conoidal surface $c^3$ engages the tapered shoulder or surface $a^6$ on member A at which point it will be positively arrested so that the contraction of the ring D will be arrested before it is jammed against the wall of member B while the ring D engages the shoulder $b^2$ to hold the members against longitudinal separation. As a result, the members A and B will be held together by ring D against longitudinal separation but free to rotate as is necessary in air-line couplings. To disconnect the members, the sleeve C is turned to bring it into position shown in Fig. 2, and during such turning the ring D will expand to permit the shoulder $b^2$ to pass therethrough.

The invention exemplifies an air-line coupling in which the members are locked against longitudinal movement by an inwardly contractible resilient ring which is held between one member and the coupling-sleeve which is retained in the sleeve so that it is not likely to become separated from the coupling or lost or misplaced; a coupling of the type which can be produced at a low cost and which is efficient in operation to secure the members against longitudinal separation while permitting the relative rotation necessary in the use of air-line couplings of this type.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. An air-line coupling comprising a pair of tubular members, a coupling-sleeve having a screw-threaded connection with one member, a normally expanded and inwardly contractible ring in the sleeve and between said one member and the sleeve, an annular shoulder on the other member, and coacting conoidal wedge-surfaces on the sleeve and said one member for contracting the ring to overlap said shoulder and secure the members against separation when the sleeve is screwed onto the member to which it is connected.

2. An air-line coupling comprising a pair of tubular coupling-members, a coupling-sleeve having a screw threaded connection with one member, a normally expanded and inwardly contractible ring in the sleeve and engaging the member to which the sleeve is threaded, a shoulder on the other member, wedge means operable in response to rotation of the sleeve in one direction relatively to said one member to force the ring to overlap said shoulder and thus secure the members against separation, and means to limit travel of the sleeve relatively to said one member so as to prevent the ring from jamming against said other member and precluding relative rotation of the members.

3. An air-line coupling comprising a pair of tubular coupling-members, a coupling-sleeve having a screw threaded connection with one member, a normally expanded and inwardly contractible ring in the sleeve and engaging the member to which the sleeve is threaded, a shoulder on the other member, conoidal wedge surfaces on the sleeve and said one member for contracting the ring to overlap said shoulder and secure the members against separation when the sleeve is screwed onto the member to which it is threaded, and means on said one member adapted to abut against the wedge surface on the sleeve to limit the travel of the sleeve relatively to said one member in order to prevent the ring from jamming against said other member and precluding relative rotation of the two coupling members.

Signed at Chicago, Illinois, this 19th day of August, 1929.

LEONIDAS D. WOODRUFF.